May 19, 1959 G. C. CURRIE 2,887,020
CARTON SETTING UP MACHINE
Filed April 2, 1957 8 Sheets-Sheet 1
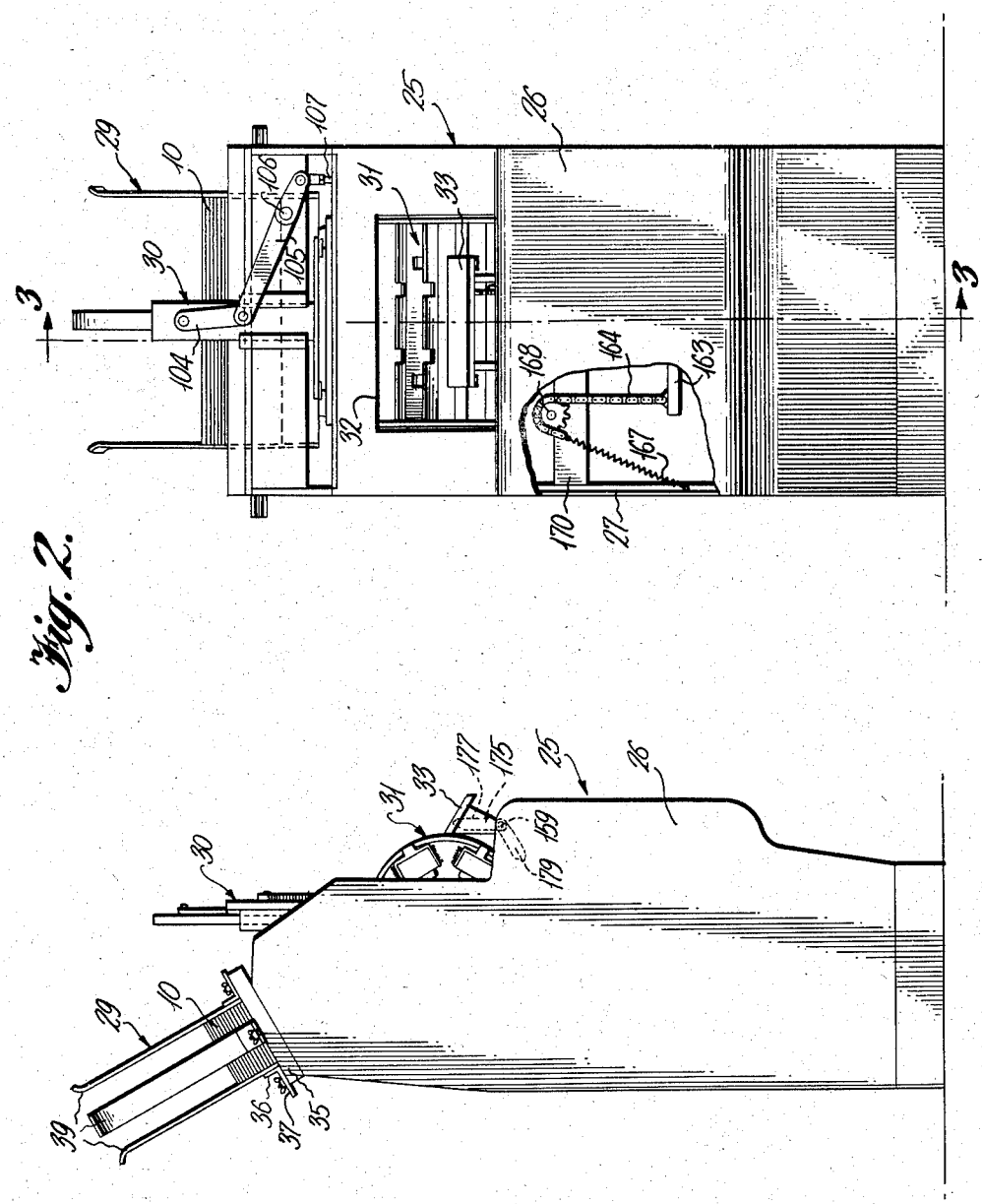
INVENTOR
Grover C. Currie
BY
Mason, Fenwick & Lawrence
ATTORNEYS May 19, 1959 G. C. CURRIE 2,887,020
CARTON SETTING UP MACHINE
Filed April 2, 1957 8 Sheets-Sheet 2

INVENTOR
Grover C. Currie
BY
Mason, Fenwick & Lawrence
ATTORNEYS

May 19, 1959 G. C. CURRIE 2,887,020
CARTON SETTING UP MACHINE
Filed April 2, 1957 8 Sheets-Sheet 4

INVENTOR
Grover C. Currie
BY Mason, Fenwick & Lawrence
ATTORNEYS

May 19, 1959  G. C. CURRIE  2,887,020
CARTON SETTING UP MACHINE
Filed April 2, 1957  8 Sheets-Sheet 5

INVENTOR
Grover C. Currie

BY
Mason, Fenwick & Lawrence
ATTORNEYS

May 19, 1959 G. C. CURRIE 2,887,020
CARTON SETTING UP MACHINE
Filed April 2, 1957 8 Sheets-Sheet 6

INVENTOR
Grover C. Currie
BY Mason, Fenwick & Lawrence
ATTORNEYS

May 19, 1959  G. C. CURRIE  2,887,020
CARTON SETTING UP MACHINE
Filed April 2, 1957  8 Sheets-Sheet 7

INVENTOR
Grover C. Currie
BY Mason, Fenwick & Lawrence
ATTORNEYS

May 19, 1959 G. C. CURRIE 2,887,020
CARTON SETTING UP MACHINE
Filed April 2, 1957 8 Sheets-Sheet 8

INVENTOR
Grover C. Currie
BY Mason, Fenwick & Lawrence
ATTORNEYS

United States Patent Office 2,887,020
Patented May 19, 1959

2,887,020

CARTON SETTING UP MACHINE

Grover C. Currie, Charlotte, N.C.

Application April 2, 1957, Serial No. 650,125

16 Claims. (Cl. 93—51)

The present invention relates in general to apparatus for setting up boxes or cartons, and more particularly to machines for setting up cartons or trays from flat cardboard blanks or other sheet material, the foldable parts of which initially lie in a common plane.

The apparatus of this invention is designed especially for processing flat scored blanks of cardboard or the like to form elongated upwardly opening trays or cartons for packaging tomatoes or like commodities. Such upwardly opening elongated trays or cartons conventionally comprise a pair of upwardly folded elongated side walls at the opposite lateral margins of the bottom panel spaced apart a distance corresponding substantially to the diameter of the tomatoes or the width of the commodities to be packaged therein, upwardly folded end panels at each end of the bottom panel terminating in tapered flaps folded inwardly into parallelism with the bottom panel substantially in the plane of the tops of the group of commodities, and infolded gussets joining the side and end panels and locked between the end panels and infolding locking flaps to retain the carton in set-up condition.

An object of the present invention is the provision of an improved carton set-up machine which is adapted to feed successively flat blanks for forming upwardly opening cartons of the above-described type from a hopper and set up the same rapidly and efficiently, through automatically controlled instrumentalities in the machine.

Another object of the present invention is the provision of a machine for automatically feeding flat cardboard blanks from a large supply of the same and erecting the blanks into upwardly opening cartons, which machine is entirely automatic in operation and capable of large output for commercial use and which sets up the cartons with great precision and accuracy.

Another object of the present invention is the provision of a novel mechanism for setting up cartons of the type described which will fold the side and end walls of flat single layer blanks to upright positions, fold locking flaps into restraining relation with extensions of the end and side walls and into interlocking engagement with the bottom panel to retain the end and side walls in upright position and thus set up the entire blank through a novel arrangement of mechanical instrumentalities, and hence eliminate costly prefolding and gluing of the blank before setting up.

Another object of the present invention is the provision of a novel carton set-up machine having improved feeding means to insure delivery of but one blank at a time from a stack of a plurality of blanks to the folding instrumentalities, improved means for folding of the parts of the blank into set-up position, and improved means for insuring secure interlocking of the parts of the blank in set-up position.

Other objects, advantages and capabilities of the present invention will become apparent from the following detail description, taken in conjunction with the accompanying drawing illustrating one preferred embodiment of the invention.

In the drawings:

Figure 1 is a side elevation of the machine;

Figure 2 is a front elevation of the machine, with portions of the front wall of the machine casing broken away to reveal the internal construction thereof;

Figures 5, 12:
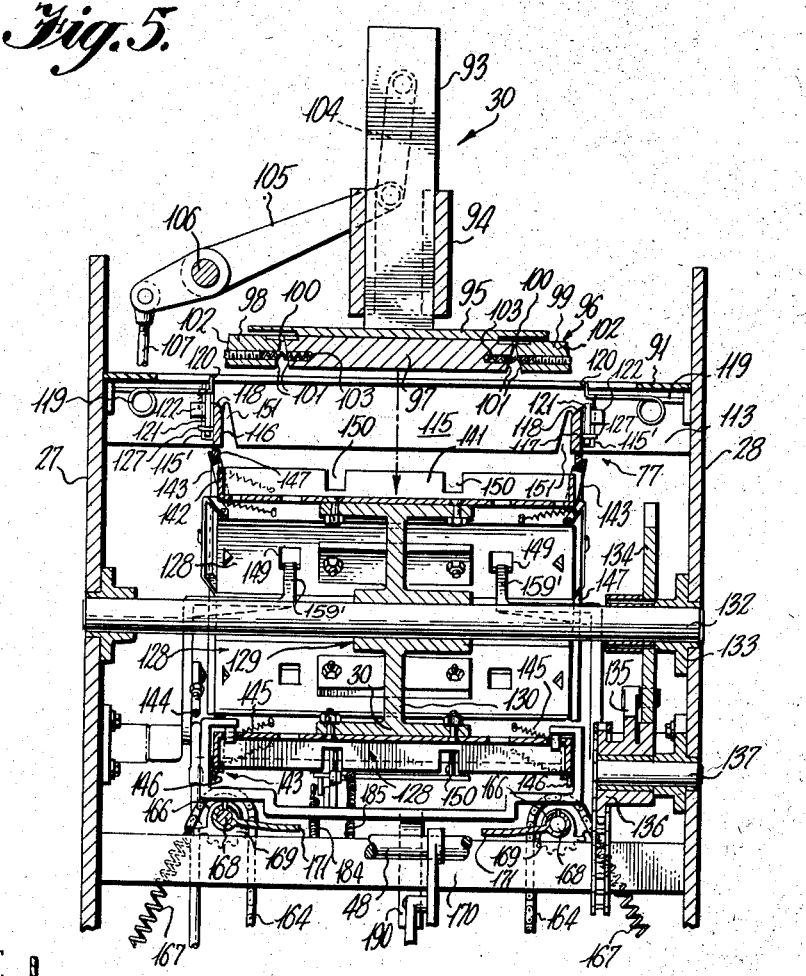
Figure 5 is an enlarged fragmentary vertical section view illustrating the forming die and plunger mechanism, the advancing turret, and associated components of the machine, taken along the line 5—5 of Figure 3.
Figure 12 is a fragmentary vertical section view of an end portion of a turret tray for receiving the blanks from the forming die, with one of the blanks supported therein.
Figure 6:
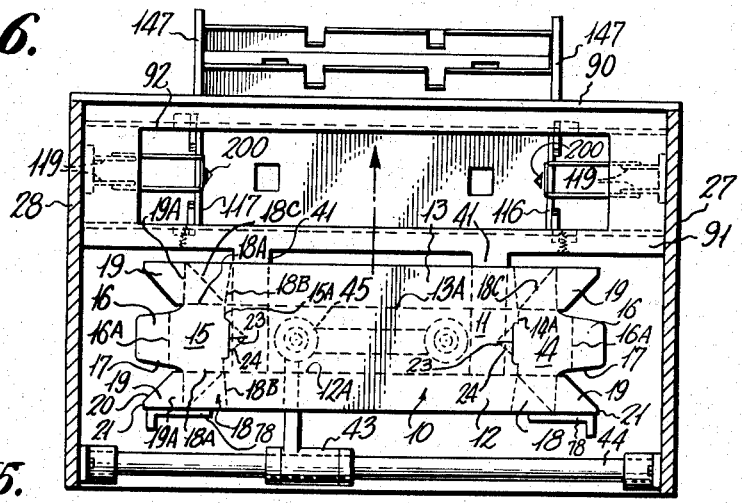
Figure 6 is a horizontal section view taken along the line 6—6 of Figure 4.

The upwardly opening cartons or trays intended to be set up by the carton set-up machine herein disclosed are of the design illustrated particularly in Figures 6, 12, 13 and 14. The carton blanks as shown in Figure 6 and indicated in general by the reference character 10, are die cut from cardboard stock, which is scored and slotted as hereinafter described and are supplied to the customer in flat condition to be set up and used in packaging commodities of various types. The flat cardboard blank 10 has a substantially rectangular bottom panel 11 along the opposite lateral edges of which are opposite side panels 12, 13 which are hinged to the bottom panel along score lines 12A—13A. End panels 14, 15 are hinged along score lines 14A—15A to the bottom panel 11 and terminate in end flaps 16 hinged along transverse score lines 16A to the end panels 14, 15. The terminal portions of the ends of the cartons formed by the end panels 14, 15 and their end flaps 16 are tapered, as indicated at 17, toward the free ends of the end flaps 16 from a point intermediate the transverse score lines 14A—15A and the score lines 16A so that when the end panels are in erect position, the taper commences at a point slightly above the upper edges of the side panels 12, 13. Hinge sections 18 which are almost rectangular are hingedly connected along score lines 18A at one edge thereof to the sides of the end panels 14, 15 and are hingedly connected to the ends of the side panels 12, 13 by score lines 18B which join the score lines 12A—13A at the juncture of the score lines 12A—13A with the score lines 14A—15A and forms an angle of slightly less than 90 degrees with the score lines 12A—13A. The hinge sections 18 are also provided with inclined intermediate score lines 18C which extend almost diagonally through the hinge sections 18 from the intersections of the inclined score lines 18B with the score lines 12A—13A, and permit infolding of the substantially triangular components of the hinge sections 18 about the intermediate score lines 18C to form, in effect, a gusset fold. Locking flaps or tongues 19 are hinged along score lines 19A to the edges of the hinge sections 18 opposite the edges contiguous to the score lines 18B. The locking flaps 19 are provided with an inclined longitudinal edge 20 providing a substantially pointed end 21 which is adapted to be inserted into cuts 22 formed in the intermediate regions of the end panel score lines 14A—15A in a manner to be later described. Preferably, slits 23 joining the midpoints of cuts 22 extend perpendicular to the cuts 22 and toward each other and inwardly converging scores 24 extend from the ends of cuts 22 to the free ends of slits 23 to define triangular safety lock formations to be pushed upwardly out of the bottom for retaining the pointed ends 21 in the cuts 22. The edges of the locking flaps 19 opposite the inclined longitudinal edges 20 constitute the extensions of the free edges of the side panels 12, 13.

Figure 14:
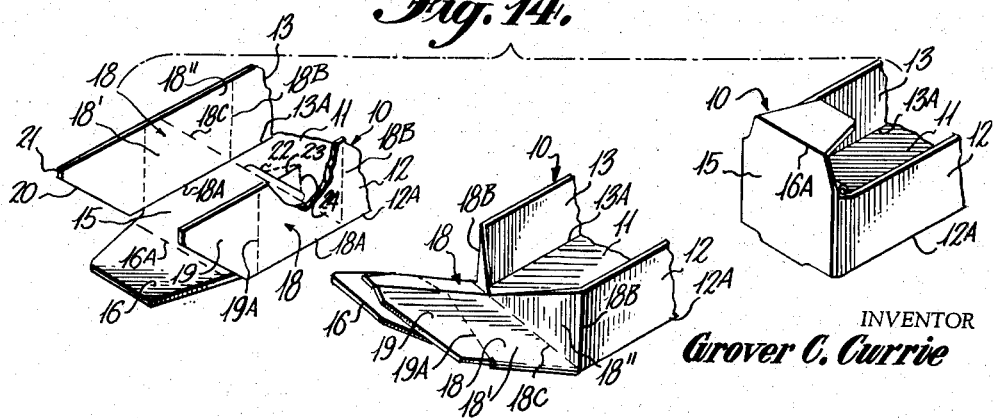
Figure 14 is a fragmentary perspective view of the end portions of three carton blanks illustrating three stages of folding thereof to set-up condition.

Referring to Figure 14, illustrating one end of the carton in various stages of setting up the assembled carton, the first operation to which the flat blank is subjected is the infolding of the aligned lateral folding sections formed by the side panels 12, 13, the hinge sections 18, and the locking flaps 19 into erect position relative to the bottom panel 11 about the score lines 12A—13A and 18A. This is illustrated in the left hand drawing in Figure 14. The hinge sections 18 are then folded inwardly as illustrated in the middle drawing in Figure 14 by folding the same about the intermediate substantially diagonal score lines 18C, and the end units formed by the end panels 14, 15 and end flaps 16 are simultaneously folded upwardly into erect position about their score lines 14A—15A. The sections 18' of the hinge sections 18 and the locking flaps 19, during this stage, assume a position underlying and abutting the end panels 14, 15 and their end flaps 16, and come into overlapping abutting relation with the triangular sections 18'' of the hinge sections 18. After the end portions have been folded to the erect position as illustrated in the right hand drawing of Figure 14, the locking flaps 19 which have been brought into coplanar relationship at each end of the carton are folded inwardly about the score lines 19A which lie substantially in the plane of the free edges of the side panels 12, 13, and are continued downwardly until the pointed ends 21 thereof are tucked into the cuts 22, in which condition the locking flaps 19 are retained with the hinge sections 18 sandwiched between the locking flaps 19 and the end panels 14, 15. The pair of triangular sections of the safety lock associated with each cut 22 formed by the cuts 22 and 23 and the scores 24 are then pushed upwardly to insure retention of the pointed ends 21 in the cuts 22. The end flaps 16 may be folded inwardly about their score lines 16A into parallelism with the bottom panel 11 at any stage after the end panels 14, 15 have been folded into erect position.

The machine for setting up the blanks 10 is indicated generally by the reference character 25. Most of the operating components making up the machine are housed in a suitable casing 26 and are supported on heavy upright frame plates 27, 28 to which the casing 26 is secured. The external appearance of the preferred form of the machine as produced for commercial use is illustrated in Figures 1 and 2. The externally visible components of the machine comprise the hopper 29 for the flat cardboard blanks 10 from which the cartons or trays are formed, a reciprocating plunger assembly 30, a turret assembly 31 which projects partially through a discharge opening 32 in the machine cover 26, and a sloping discharge plate 33 positioned adjacent the ejector station of the turret assembly 31 to receive the set-up cartons and direct them onto a carton discharge conveyor of any suitable form, indicated by the reference character 34 in Figure 3.

Figure 3:
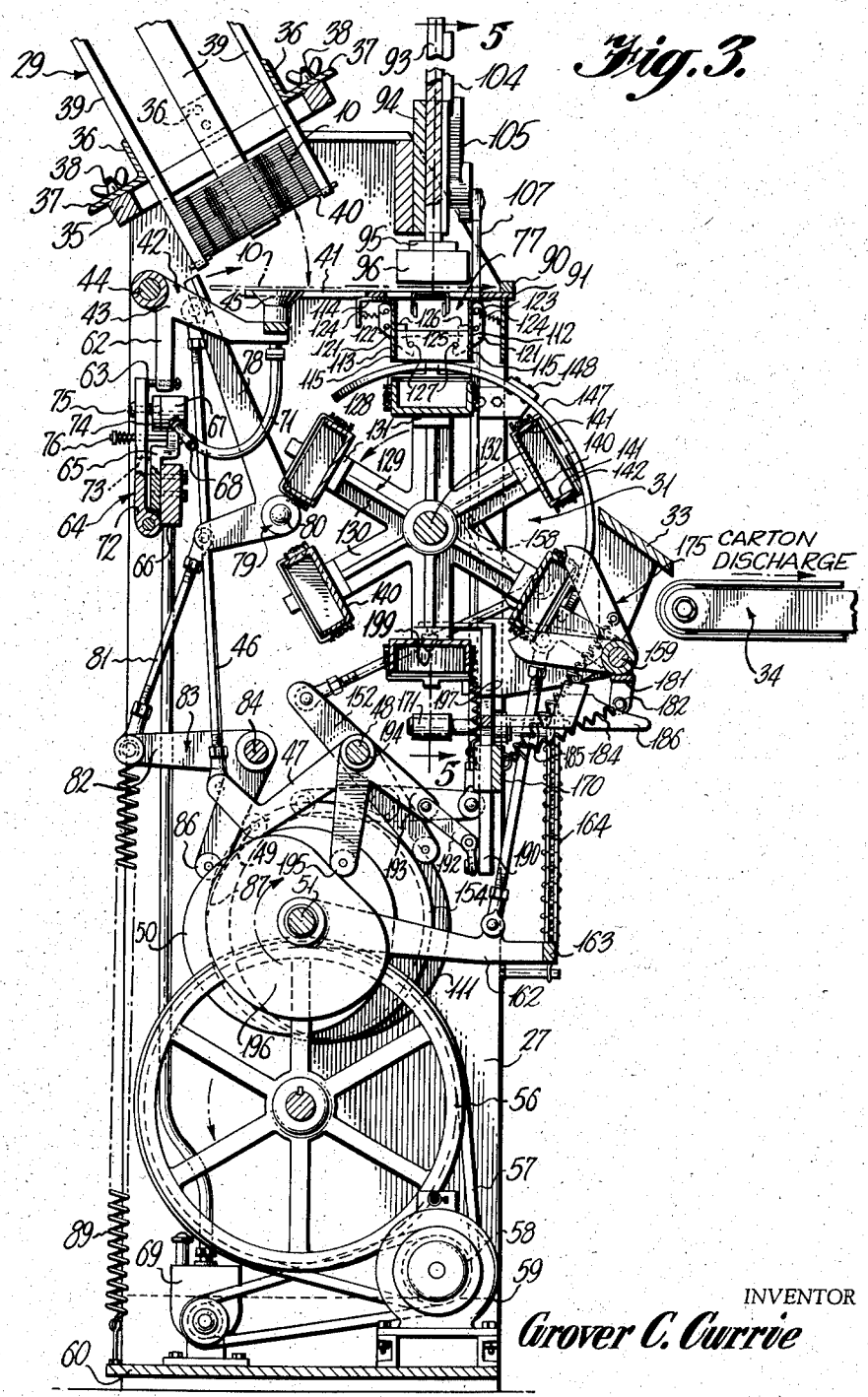
Figure 3 is a vertical section view of the machine taken along the line 3—3 of Figure 2, with the casing removed.
Figure 4:
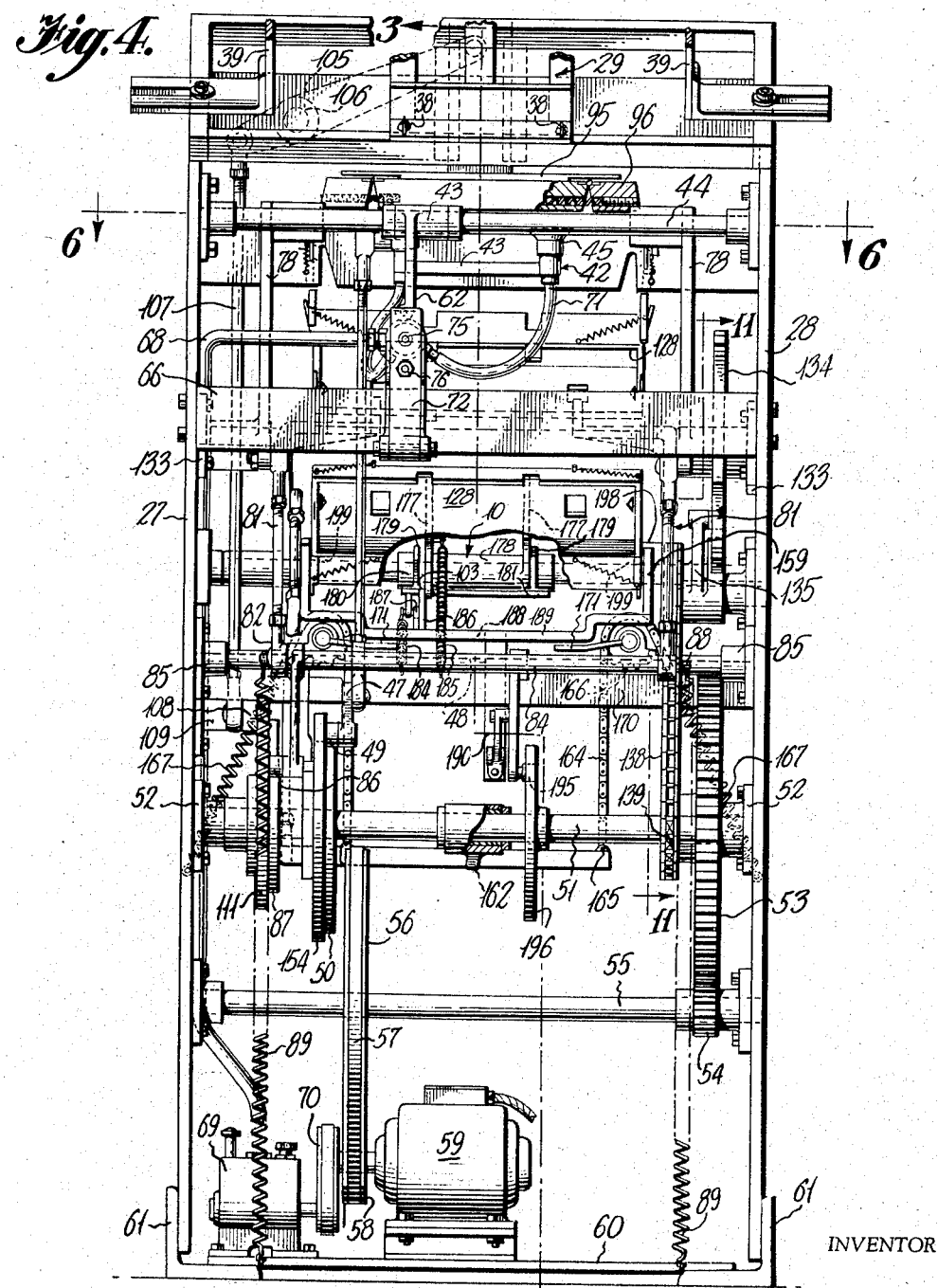
Figure 4 is a rear elevation of the machine with the machine casing removed.

The hopper assembly 29, the structure of which is shown to enlarged scale in Figures 3 and 4 comprises a rectangular open hopper supporting frame 35 which is rigidly affixed to inclined upper edge portions of the frame plates 28, 29, on each of the legs of which is mounted an adjustable angle iron bracket 36 having a slotted flange 37 which is adjustably positioned on the associated leg of the frame 25 by a thumb nut unit 38. The other flanges of each of the angle iron brackets 36 are disposed inwardly of the legs of the hopper frame 35 and support guide rails 39 which project a substantial distance above and below the plane of the hopper frame 35 and are relatively adjustable toward and away from each other by means of the thumb nut units 38 and slotted flanges 37 to form the midpoints of four sides of a substantially rectangular opening which has inside cross section dimensions corresponding to the dimensions of the flat blanks 10. The lower extremities of each of the guide rails 39 are provided with inwardly projecting resiliently biased pins 40 forming stop means for limiting downward movement of the lowermost blank of the stack of blanks 10 to be supported between the guide rails 39.

Figure 7:
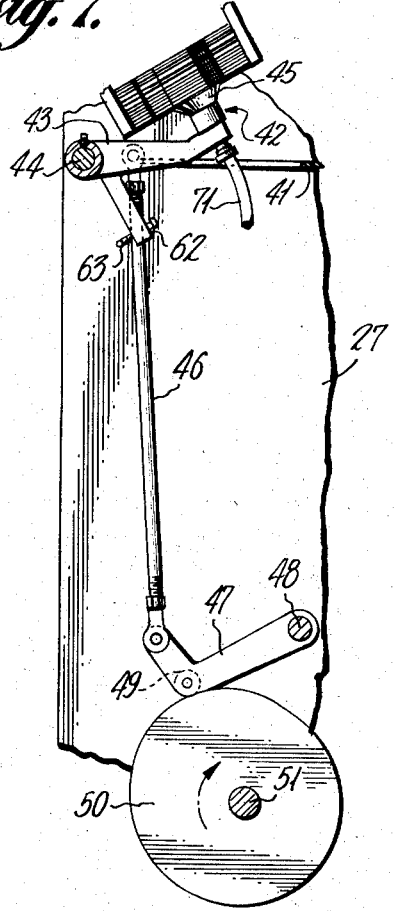
Figure 7 is an enlarged fragmentary vertical section view of the instrumentality for withdrawing the lower carton from a stack of cartons onto the feeding platform.

Disposed below the lower end of the rectangular opening defined by the guide rails 39 of the hopper 29 are a pair of blank-supporting rails 41 which lie in a horizontal plane and are spaced laterally apart as more clearly illustrated in Figure 6. Extending between the blank-supporting rails 41 and likewise disposed beneath the rectangular opening defined by the guide rails 39 is a suction head assembly, generally indicated at 42 and illustrated more clearly in Figure 7, which is designed to remove the lowermost blanks 10 one at a time from the hopper 29 and deposit them onto the blank-supporting rails 41. The suction head assembly 42 comprises a suction head lever 43 which is pivotally supported at one end on a transverse shaft 44 mounted at each end in the frame plates 27, 28 and supports a pair of laterally spaced vacuum cups 45 on the other end of the lever 43 for movement from the position illustrated in Figure 7 wherein the vacuum cups are in engagement with the surface of the lowermost blank 10 to the position illustrated in Figure 3 wherein the lowermost blank 10 is deposited onto the blank supporting rails 41. An adjustable connecting rod 46 is connected at one end to the suction head lever 43 and at the other end to the end of one leg of a bell crank cam follower lever 47 whose other end is pivotally journalled on a transverse shaft 48 supported at its ends on the frame plates 27, 28. A cam roller 49 is affixed to the bell crank cam follower lever 47 to ride on the periphery of a cam 50 keyed to the transverse master cam shaft 51 whose ends are journalled in suitable bearings 52 affixed to the frame plates 27, 28. The master cam shaft 51 is provided with a gear 53 to be driven by a drive gear 54 keyed to the shaft 55 on which is also keyed a pulley sheave 56 connected by the belt 57 with the pulley sheave 58 on the output shaft of an electric motor 59, which in the preferred embodiment is a one-third horsepower alternating current electric motor mounted on the base plate 60 which is rigidly connected by means of angle irons 61 or the like to the lower ends of the frame plates 27, 28 and extends transversely between them.

Depending integrally from the suction head lever 43 is a valve control arm 62 having a set screw 63 threaded into the lower portion thereof and projecting rearwardly of the arm 62. Immediately below the valve control arm 62 is a suction valve unit 64 comprising a suction valve housing 65 which is rigidly affixed to a transverse cross bracing member 66 secured to the side plates 27, 28 and which terminates at its upper end in a rearwardly opening valve chamber 67 which is connected by means of a suitable conduit 68 to a suction pump 69 driven through a belt and pulley drive 70 from the electric motor 59. The vacuum chamber 67 is also connected by suitable flexible conduits 71 to the suction cups 45. A suction valve lever 72 is pivotally connected at its lower end to the lower end of the suction valve housing 65 and projects between a pair of guide arms 73 projecting rearwardly from the housing 65 and above the housing in a position to be engaged by the end of the set screw 63 on the valve control arm 62. A valve disk 74 for closing the rearwardly opening valve chamber 67 is supported on the suction valve lever 72 by means of a bolt 75 extending through the lever 72 and having a nut threaded thereon bearing against the inner face of the valve disk 74. A coil spring surrounds the bolt 75 and is located between the lever 72 and the disk 74. An adjustable spring and nut unit 76 likewise extends through the lever 72 and suction valve housing 65 to resiliently urge the lever 72 and valve disk 74 toward the housing 65 and into valve closing position.

Upon rotation of the cam 50, the suction head lever 43 is oscillated about the shaft 44 to rotate the suction cups 45 upwardly into engagement with the lower surface of the lowermost blank 10, and is then lowered again to the position shown in Figure 3. During the first portion of this cycle, the counterclockwise rotation of the suction head lever 43 from the position of Figure 1 withdraws the set screw 63 on the valve control arm 62 out of contact with the suction valve lever 72, permitting the lever 72 to be rotated under the force of the spring 76 to bring the disk 74 against the open end of the valve chamber 67. During the remainder of the cycle of operation of the suction head lever 43 until the screw 63 again contacts the suction valve lever 72, the valve chamber 67 will be sealed from the atmosphere and the pump 69 will produce a vacuum at the suction cups 45 to permit the suction cups to hold the blank 10 contacted thereby. When, however, the suction head lever 43 returns to the Figure 3 position, at which point the lowermost blank 10 will have been transferred to a position resting upon the blank-supporting rails 41, the set screw 63 on the arm 62 again engages the suction valve lever 72 and causes the same to rotate in a counterclockwise direction against the action of the spring 76 to shift the valve disk 74 away from the vacuum chamber 67 and vent the latter to the atmosphere, breaking the suction at the suction cups 45 and releasing the blank 10.

Figure 8:
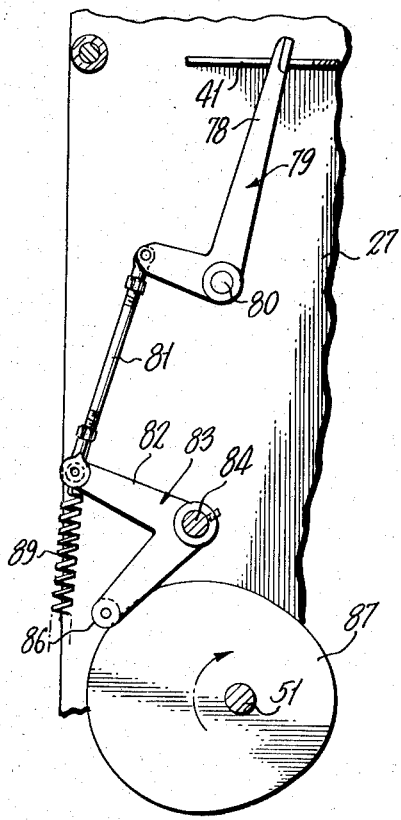
Figure 8 is an enlarged fragmentary vertical section view of the instrumentalities for periodically advancing the blanks individually along the feeding platform to the forming die station.

The blank 10 which has thus been deposited on the blank-supporting rails 41 is then advanced to the position of the forming die, generally indicated at 77, by means of a pair of pusher arms 78 disposed adjacent the frame plates 27, 28 and forming corresponding arms of bell crank levers 79 rotatably supported on stub shafts 80 affixed to each of the frame plates. This blank pusher mechanism is more clearly illustrated in Figure 8. The rearwardly projecting arms of the bell crank levers 79 are each connected to an adjustable connecting rod 81 and the connecting rod 81 associated with one of the bell crank levers 79 is connected to the arm 82 of a bell crank cam follower 83 which is keyed to a transverse shaft 84 journalled for rotation in suitable bearings 85 mounted on the frame plates 27, 28, the other arm of the cam follower 82 having a cam roller 86 riding on a cam 87 likewise keyed to the master cam shaft 51. The other connecting rod 81 is connected to an arm 88 which is identical to the arm 82 of the bell crank cam follower 83 and is likewise keyed to the shaft 84. Suitable springs 89 are connected between the ends of the arms 82 and 88 and the base plate 60 to continuously urge the pusher arms 78 to their rearmost position illustrated in Figure 3. Accordingly, upon rotation of the pusher cam 87, the pusher arms 78 of the bell crank levers 79 will be oscillated from the position illustrated in Figure 3 to the position illustrated in Figure 8, during which action the upper ends of the pusher arms 78 will engage the rear edge of the blank 10 which has been deposited on the blank-supporting rails 41 and slide the blank in a horizontal plane into a proper position of registry with the forming die 77. A suitable stop member 90 is provided at the forward edge of the blank-supporting platform 91 forming a continuation of the blank-supporting rails 41 to be engaged by the leading edge of the blank 10 as the same is advanced to the die-forming station and insure proper registry of the blank with the forming die 77.

Figure 9:
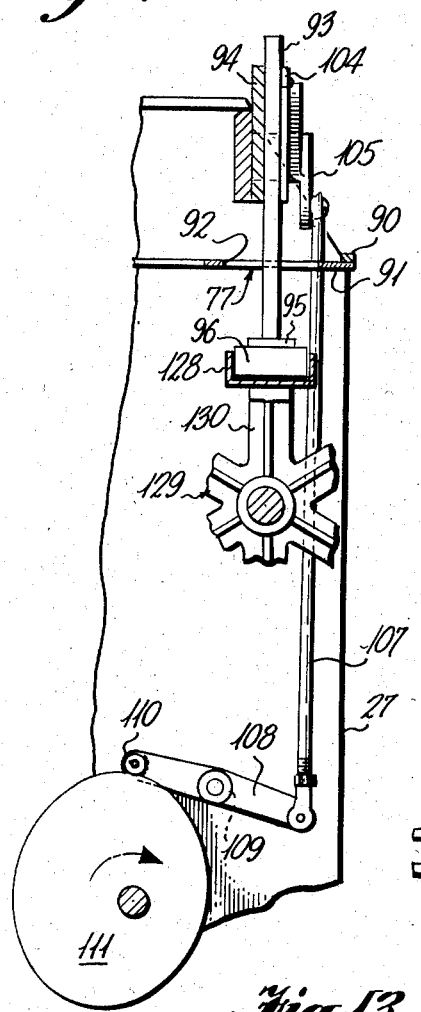
Figure 9 is an enlarged fragmentary vertical section view of the instrumentalities for actuating the plunger of the forming die.

The blank-supporting platform 91 is provided at the forming die station with a laterally elongated rectangular opening 92 through which the flat blank 10 which has been advanced thereto is projected downwardly by the reciprocating plunger assembly 30. Referring particularly to Figures 3, 5 and 9, the reciprocating plunger assembly 30 comprises a vertically arranged plunger bar 93 which is of rectangular cross-section and which is slidably supported and guided for axial vertical movement in guide member 94 rigidly supported on the frame plates 27, 28. Welded to the lower end of the plunger bar 93 and lying in a horizontal plane, is a plunger supporting plate 95 to which the plunger 96 is affixed in depending relation. The unit making up the plunger 96 is of rectangular horizontal outline corresponding to the dimensions of the bottom panel 11 of the carton blank 10 and comprises a central block 97 which corresponds to the width of the bottom panel 11 and is substantially shorter than the length of the bottom panel 11 and a pair of laterally spaced end blocks 98, 99 which are connected to the central block 97 by the hinges 100. The end surfaces of the central block 97 and the adjacent surfaces of the end blocks 98 diverge downwardly from the hinges 100, as is indicated at 101, to accommodate downward pivotal movement of the end blocks 98 of the plunger 96 relative to the axes of the hinges 100, and the outer end surfaces 102 of the end blocks 98, 99 inclined downwardly and outwardly away from each other. Suitable coil springs 103 adjustable by set screws or like means are seated in aligned bores in the adjacent portions of the central block 97 and end blocks 98, 99 to resiliently urge the end blocks 98, 99 upwardly about the hinges 100 into horizontal alignment with the central block 97.

The plunger bar 93 is coupled through a connecting link 104 to one end of the plunger actuating lever 105 which is supported for rotation on a fixed stub shaft 106 projecting from the frame. The opposite end of the plunger actuating lever 105 is connected through an adjustable connecting rod 107 to one end of a cam follower lever 108 supported on a stub shaft 109 mounted on the frame plate 27. A cam roller 110 on the opposite end of the cam follower lever 109 rides on the periphery of the plunger actuating cam 111 keyed to the master cam shaft 51. Upon rotation of the plunger actuating cam 111, the plunger actuating lever 105 will be oscillated about the shaft 106 to produce vertical reciprocation of the plunger bar 93 and plunger 96 from its uppermost position, as illustrated in Figures 3 and 5, to a lowermost position, as illustrated in Figure 9, wherein the plunger 96 is projected a substantial distance below the blank-supporting platform 91.

The forming die, generally indicated at 77, is supported in depending relation to the blank-supporting platform 91 by the frame plates 27, 28. The forming die 77, which is best illustrated in Figures 3, 4 and 5, comprises a pair of identical but oppositely related side plow plates 112, 113, having horizontal flanges 114 disposed in lapping relation with the portions of the blank-supporting platform 91 bounding the opening 92, and vertical depending flanges 115 which are connected by a smoothly curved bend with the flanges 114 and depend downwardly from the platform 91 with the inner surfaces of the flanges 115 substantially in registry with the sides of the plunger 96. Identical end plow plates 116, 117 extend transversely between and are supported by the vertical flanges 115 of the side plow plates 112, 113 and are spaced from each other so that their inwardly facing surfaces are substantially in vertical alignment with the outermost edges of the ends 102 of the end blocks 98, 99 when the same are in horizontal alignment with the central block 97. The upper edges 118 of the end plow plates 116, 117 are spaced below the upper extent of the vertical flanges 115 where they commence to bend into the horizontal flanges 114, such spacing corresponding to the height of the side panels 12, 13 of the blanks 10, and in practice are spaced approximately one inch below the blank-supporting platform 91. Suitable U-shaped springs 119 project toward each other from the frame plates 27, 28 and have upwardly offset terminal portions 120 which are spaced slightly outwardly of the end plow plates 116, 117, and rise to the plane of the blank-supporting platform 91. The springs 119 are readily deformable, their terminal portions 120 being for the purpose of resiliently supporting the end portions comprising the end panels 14, 15 and end flaps 16 of the blank 10 when the blank is in registry with the opening 92 and to be readily deformed downwardly with the blank 10 during initial movement of the blank 10 downwardly through the opening 92 and into engagement with the upper edges of the end plow plates 116, 117, to resiliently resist movement of the blank downwardly under the influence of the plunger.

Accordingly, during the initial portion of the downward stroke of the plunger 96 from its raised position of Figure 3, the side strips of the blank 10 comprising the longitudinally aligned side panel 12, hinge sections 18, and locking flaps 19 on the one side and the side panel 13, hinge sections 18, and locking flaps 19 on the other side, are folded upwardly in perpendicular relation with the bottom panel 11, as illustrated at the left of Figure 14, by the portions of the side plow plates 112, 113 lying above the upper edges of the end plow plates 116, 117. Immediately before the bottom strip, comprising the bottom panel 11, the end panels 14, 15 and end flaps 16, reaches the upper edges of the end plow plates 116, 117, the bottom strip of the blank 10 engages and actuates gusset-folding levers 121 disposed at each corner of the rectangular die opening formed by the plow plates. These gusset-folding levers 121 are in the shape of modified bell crank levers which are pivoted, as indicated at 122, on blocks affixed to the sides of the side plow plates 112, 113 facing away from the die opening and comprise an upwardly projecting leg 123 which extends vertically along the flanges 115 of the side plow plates with its inwardly disposed edge lying in accommodating opening 115' in the flanges 115, permitting free movement of the levers into the space between the flanges 115. The legs 123 are resiliently biased away from the side plow plates 112, 113 by means of the springs 124. The other legs 125 project substantially horizontally inwardly of the side plow plates 112, 113 through accommodating openings therefor to define substantially horizontal shoulders 126 which project between the side plow plates 112, 113 and lie immediately above the upper edges of the end plow plates 116, 117. The gusset-folding levers 121 are disposed alongside the outwardly facing surfaces of the end plow plates 116, 117 and are provided with projections on the horizontal legs 125 to engage stop pins 127 projecting from the end plow plates 116, 117 to limit rotation of the levers 121 under the bias of their springs 124 and position the same as illustrated in Figure 3.

Figure 11:
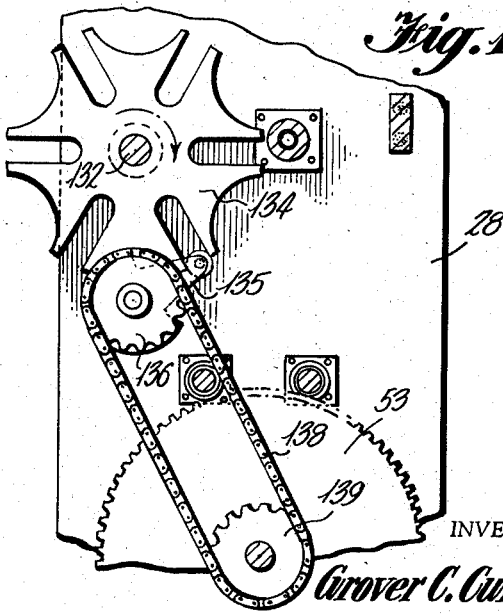
Figure 11 is an enlarged fragmentary vertical section view of the Geneva drive mechanism for the turret assembly.
Figure 13:
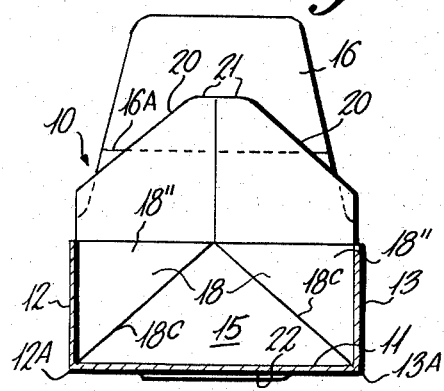
Figure 13 is a vertical transverse section view of a carton blank at an intermediate stage in the set-up procedure, taken along the line 13—13 of Figure 12.

Accordingly, during the downward travel of the blank 10 from the point where the end panels 14, 15 engage the shoulders 126 of the gusset-folding levers 121, the gusset-folding levers 121 will be rotated about their pivots 122 by the blank 10 to shift the legs 123 thereof into engagement with the hinge sections 18 in the region of the diagonal score lines 18C to progressively fold the hinge sections 18 inwardly about the score lines 18C. During this period, the end panels 14, 15 of the blank 10 are brought into engagement with the upper edges of the end plow plates 116, 117 which progressively fold the end panels 14, 15 and end flaps 16 upwardly as the blank 10 travels downwardly between these plow plates. The middle drawing in Figure 14 illustrates the condition of the blank 10 immediately after the end panels 14, 15 have begun to descend between the end plow plates 116, 117. At the lowermost limit of movement of the plunger 96, as illustrated in Figure 9, the blank 10 which has been folded to the condition illustrated in Figures 12 and 13, is deposited into the upwardly opening carton supporting tray 128 which is positioned immediately below and in registry with the forming die 77 by the Geneva turret assembly 31. The Geneva turret assembly 31 comprises a turret member 129 having six radial arms 130 which terminate in mounting plates 131 to which six of the carton supporting trays 128 are fixed by bolts or the like, the turret member 129 being keyed or pinned to a horizontal turret shaft 132 journalled for rotation in suitable bearings 133 in the frame plates 27, 28. The turret 129 is rotated in a step-wise fashion by means of a Geneva drive comprising a Geneva sprocket 134 which is likewise keyed to the shaft 132 and which is driven by a Geneva drive arm 135 having a sprocket 136 integral therewith mounted for rotation on a stub shaft 137 supported by the side frame 28. These components are illustrated in enlarged scale in Figure 11. A chain 138 is trained about the sprocket 136 and about a sprocket 139 fixed to the master cam shaft 51, to be driven in synchronism therewith.

The six carton-supporting trays 128 are all of identical construction and comprise a cast metallic body having a bottom wall 140, opposite side walls 141, and opposite end walls 142. Suitable carton retaining clamps are provided at each end of the trays 128 comprising U-shaped metallic strips 143 whose legs are pivoted at 144 to the side walls 141 of the trays adjacent the end walls with the bridge or bight portions of the straps 143 disposed to override the upper edges of the tray end walls 142 and engage and erect end panels 14, 15 of the carton blanks 10. Springs 145 resiliently urge the clamping straps 143 toward each other to the position of the lowermost tray illustrated in Figure 5, suitable stop means being provided on the tray side walls 141 to limit movement of the straps 143. Upwardly projecting ears 146 extend from the bridge portions of the U-shaped clamping straps 143 in a position to be engaged by arcuate clamp disengaging rails 147 supported on brackets 148 mounted on the frame plates 27, 28 to cam the clamping straps 143 away from each other during the period when the ears 146 are brought into engagement with the rails 147 during rotation of the turret 129. This shifts the clamping strap 143 outwardly of the inner surfaces of the tray end walls 142 to condition the trays 128 for ejection or reception of the carton blanks 10.

The bottoms 140 of the trays 138 are provided with a pair of longitudinally spaced apertures 149 and the tray side walls 141 are each provided with longitudinally spaced recesses 150 in the upper edges thereof for purposes to be later described.

The upwardly facing carton-supporting tray 128 will, therefore, be positioned by the Geneva drive to receive the carton blank 10 which has been folded to the condition illustrated in Figure 12 for advancement of the carton tray 10 to the subsequent stations established by the turret assembly 31 for further manipulation of the blank. Since the end flaps 16 are in a vertical position, as illustrated in Figure 12, at the time the blank 10 is deposited in the carton-supporting tray 128 and therefore projects above the lower edges of the vertical flanges 115 of the side plow plates 112, 113, accommodating recesses 151 are provided in the flange 115 of the plow plate 113 to permit the blank 10 in the uppermost tray 128 to be shifted past the plow plate 113 as the uppermost tray is advanced in a counterclockwise direction, as viewed in Figure 3, from the uppermost turret station.

Referring to Figure 3, the turret stations will be designated by the numbers 1–6, progressing in a counterclockwise direction from the uppermost turret station wherein the tray 128 is disposed to receive the carton blank 10 from the forming die 77. Turret station No. 1, therefore, is the station for receiving cartons folded to the condition illustrated in Figure 12 from the forming die 77. Turret stations Nos. 2 and 3 are idle stations in the embodiment herein described, but may be employed for adding coding, dating, labeling, or other functions to the machine. Station No. 4 is the tucking station at which end flaps 16 are folded downwardly about their score lines 16A and the tuck flaps 19, 20 are folded into overlapped relation with the hinge section portions 18″ and tucked into the cuts 22 at the ends of the bottom panel 11. Station No. 5 is the station at which the side panels 12, 13 are folded to bend the same inwardly about the score lines 12A—13A beyond a 90-degree relation to the bottom panel 11 to diminish the tendency of the side panels to return to coplanar relation with the bottom panel 11. Station No. 6 is the ejector station at which the set-up cartons are discharged from the machine.

Figure 10:
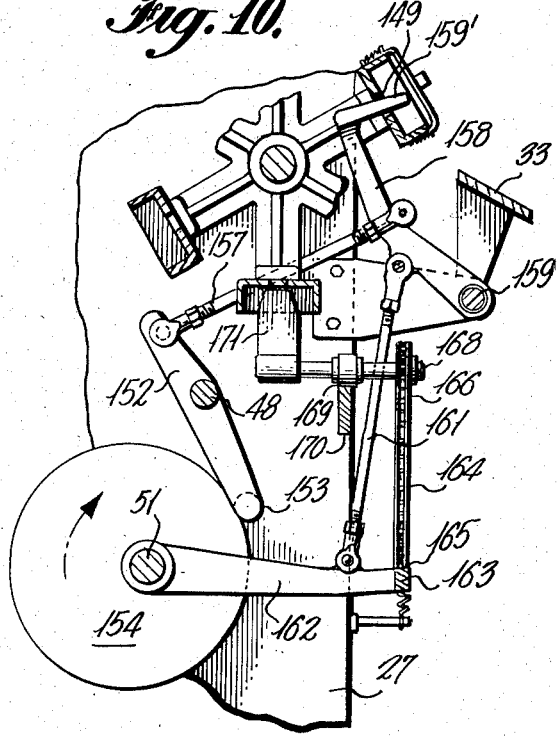
Figure 10 is an enlarged fragmentary vertical section view of the instrumentalities for interlocking the locking flaps underlying the end panels in their associated bottom panel cuts and ejecting the set-up cartons.

The manipulations at stations Nos. 4 and 6 are performed simultaneously by the same cam, the components of this mechanism being illustrated in Figure 10, and will now be described. Lever 152 is journalled for rotation on the shaft 48 and supports on its lower end a cam roller 153 which rides upon the periphery of the cam 154 keyed on the master cam shaft 51. There is pivotally connected to the opposite end of the overfolding lever 152 a connecting rod 157. The rod 157 is coupled at its other end to one of two identical ejecting levers 158 which are keyed to a transverse shaft 159 journalled for rotation in brackets 160 supported on the frame plates 27, 28, so as to simultaneously rotate the ejecting levers 158 in a clockwise direction about the shaft 159 from the position illustrated in Figure 3 to the ejecting position illustrated in Figure 10 and project the noses 159′ of the ejecting levers 158 through the apertures 149 in the tray bottoms 140 and expel the set-up carton blank 10 from the tray 128 at the turret station No. 6. A connecting rod 161 is also coupled to one of the ejecting levers 158 and to a tucker actuating lever 162 journalled for rotation on the master cam shaft 51. The tucker actuating lever 162 is provided with a T-shaped head 163 at the outer end thereof which is projected slightly beyond the forward edges of the frame plates 27, 38. Chains 164 are suitably anchored at one end, as indicated at 165, to the head 163 of the lever 162 and are trained about sprockets 166 and resiliently anchored through springs 167 to the frame plates 27, 28. The sprockets 166 are fixed on shafts 168 which project through and are journalled for rotation in bearings 169 fixed to a cross brace 170 extending between the frame plates 27, 28 and are provided at their inner ends with integral tuck flap folding plates 171 which normally extend toward each other in a substantially horizontal plane when the lever 162 is in the position illustrated in Figure 3. When, however, the lever 152 and ejecting lever 158 are rotated in a clockwise direction from the Figure 3 position by the cam 154, the tucker actuating lever 162 is elevated from the Figure 3 position to the Figure 10 position, permitting the springs 167 to shift the chains 164 in such a direction as to simultaneously rotate the sprockets 166 and tuck flap folding plates 171 in the direction of the arrows 172 in Figure 4, whereby the plates 171 engage the lower edges of the then depending carton end flaps 16 and shift the end flaps 16 and the underlying tuck flaps 19, 20 inwardly about their respective score lines to a position wherein the pointed ends 21 of the tuck flaps are projected into the cuts 22 at the ends of the bottom panel 11. The tuck flap folding plates 171 are then in the position illustrated in Figure 10. When the cam follower 153 rides up on the higher portions of the cam 154, the counterclockwise rotation of the levers 152 and 158 lowers the tucker actuating lever 162 to the Figure 3 position, drawing the anchored ends of the chains 164 downwardly and rotating the sprockets 166 and tuck flap folding plates 171 in a direction opposite that of the arrows 172 to return to their Figure 4 position.

Figure 16:
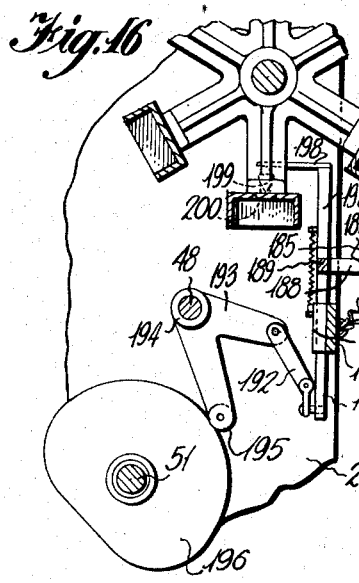
Figure 16 is an enlarged fragmentary vertical section view of the instrumentalities for overfolding the side walls of the carton.

The side panels 12, 13 of the blank are folded about the score lines 12A—13A beyond a 90 degree relation to the bottom panel 11 at station No. 5 by an overcenter side folding assembly indicated generally by the reference character 175. The side folding assembly 175 comprises a pair of aligned laterally spaced upper scissors arms 177 integral with a tubular sleeve 178 and a pair of lower scissors arms 179 integral with sleeves 180 flanking the sleeve 178 and interconnected by a bar 181. The sleeves 178 and 180 are journalled for rotation on the ejecting lever shaft 159 and are positioned to be shifted toward each other and projected into the recesses 150 in the tray side walls 141 to engage and force the side panels 12, 13 of the blank 10 toward each other, thereby breaking some of the cardboard fibers in the region of the score lines 12A—13A and dissipating some of the tendency of the side panels 12, 13 to diverge outwardly from perpendicular relation to the bottom panel 11. As illustrated in Figure 16, a cam roller 182 projects in depending relation from the interconnecting bar 181 which is welded to the sleeves 180 and a cam roller 183 projects downwardly and inwardly from the intermediate sleeve 178. Coil springs 184 and 185 are anchored at one end to the cam roller 182 and one of the upper scissors arms 177, respectively, and at their lower ends to the cross brace 170 to continuously resiliently urge the scissors arms 177, 179 toward each other. Cam surfaces 186 and 187 for the cam rollers 182, 183, respectively, are supported on an outwardly projecting cam supporting arm 188 extending from a vertically arranged yoke 189 having a depending slide bar 190 guided for vertical reciprocative movement in the guide block 191 affixed to the cross brace 170. A connecting rod 192 is coupled at one end to the yoke slide bar 190 and at the other end to an arm 193 of a lever 194 journalled on the shaft 48. A cam follower 195 is provided on the other end of the lever 194 to ride on the periphery of cam 196 keyed to the master cam shaft 51 for actuating the side folding assembly 175 in proper timed relation with the other blank manipulating mechanisms. The vertical arms 197 of the yoke 189 flank the trays 128 when the trays occupy turret station No. 4 and have inwardly projecting extensions 198 carrying depending tools 199 on the inner ends thereof adapted to be periodically projected through apertures 200 in the bottoms 140 of the trays 128 occupying station No. 4 for bending downwardly the triangular sections of the blanks 10 defined by the cuts 22 and 23 and the scores 24 and forming the safety locks for the locking flaps 19, 20.

Figure 15:
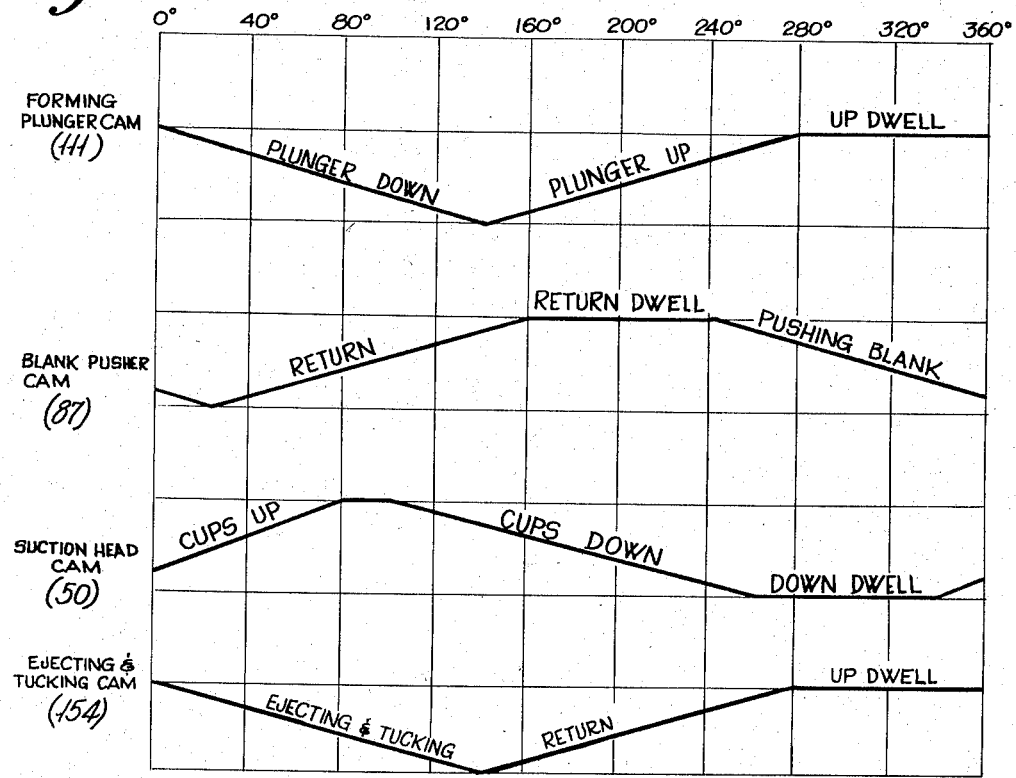
Figure 15 is a cam diagram of the machine.

The over-all operation of the carton set-up machine 25 will be more clearly understood by reference to Figure 15 showing cam diagrams for the forming plunger cam 111, the blank pusher cam 87, the suction head cam 50, and the ejecting and tucking cam 154 progressing from top to bottom. Assuming the parts to be in the initial position illustrated in Figures 3, 4 and 5, the movement of the suction head controlling lever 47 in response to the suction head cam 50 during the first 80 degrees of the cam cycle shifts the suction head lever 43 upwardly about the shaft 44 to bring the vacuum cups 45 into engagement with the surface of the lowermost blank 10 in the hopper 29. During the first portion of this upward movement of the suction head lever 43, the suction screw 63 is drawn out of engagement with the suction valve lever 72, permitting the suction lever 72 to be urged toward the suction valve housing 65 under the action of its spring 76 to close the valve disk 74 upon the valve chamber 67 and establish a vacuum in the conduit 71 and vacuum cups 45 until the suction head lever 43 returns to the Figure 3 position. The vacuum cups 45 therefore withdraw the lowermost blank 10 from the stack of blanks in the hopper 29 and transfer this blank 10 to the position illustrated in Figure 3 wherein the blank is deposited upon the rails 41 which extend rearwardly from the blank-supporting platform 91. As is shown in Figure 15, the suction head lever 43 returns to the Figure 3 position at about the 260-degree point in the cam cycle, shortly prior to which, at about the 240-degree point, the cam 87 begins actuating the bell crank lever 83 to shift the pusher arms 78 from the Figure 3 position to the Figure 8 position. This movement of the pusher arms 78 about their stub shafts 80 advances the blank 10 into registry with the forming die 77 with the leading edge of the blank 10 abutting the stop member 90. Plunger cam 111 starts the plunger 96 downwardly at approximately zero degrees in the next succeeding cam diagram cycle. The downward movement of the plunger 96 brings the lower surfaces of the blocks 97, 98 and 99 forming the plunger into engagement with the blank 10 which has just been deposited over the opening 92 of the blank-supporting platform 91 and in registry with the bottom panel 11 of the blank, and forces the blank downwardly through the opening 92 and between the vertical flanges 115 of the side plow plates 112, 113 to first fold the side panels 12, 13 and their associated hinge sections 18 and tuck flaps 19, 20 upwardly about the axes of the score lines 12A—13A, and then fold the end panels 14, 15, end flaps 16, hinge sections 18, and tuck flaps 19, 20 into erect position, as illustrated in Figures 12 and 13, through the action of the gusset-folding levers 121 and end plow plates 116, 117, as previously described. The operation of the Geneva drive to advance the Geneva turret 129 between successive turret stations occurs during the period from approximately 260 degrees of one cam diagram cycle to approximately 20 degrees of the next succeeding cam diagram cycle. Accordingly, an unoccupied tray 128 is presented at the exit end of the forming die 77 immediately prior to discharge of a carton blank 10 from the forming die under the action of the plunger 96. When the plunger which has been projected downwardly into the tray 128 at turret station No. 1 begins its ascending stroke, the end blocks 98, 99 freely pivot downwardly about their hinges 100, and due to the inclined divergent nature of the ends 102 of these end blocks 98, 99, the effective longitudinal dimension of the plunger 96 is reduced to free the plunger from the walls of the carton blank 10 and facilitate release of the carton blank into the tray 128 during withdrawal of the plunger 96.

The Geneva drive advances the turret 129 to shift the carton blank 10 which has been deposited in the tray 128 at station No. 1 step-wise through the successive stations of the turret. It will be apparent from the cam diagram of Figure 15 and the above description that on each stepwise advancement of the Geneva turret 129, a new folded carton blank 10 will be discharged from the forming die 77 into the tray 128 most recently presented to the exit end of the forming die 77 so that a set-up carton is presented by each tray 128 at the ejector station No. 6 after the first five blanks have been withdrawn from the hopper 29.

The blanks in the trays 128 are next advanced through idle turret stations Nos. 2 and 3. As the carton blanks 10 reach the next turret station No. 4, the upward movement of the tucker actuating lever 162 during the next succeeding cam cycle effects upward and opposite rotation of the tuck flap folding plates 171 to bend the end flaps 16 about their score lines 16A and tuck the flaps 19, 20 into the cuts 22. The triangular sections of the safety locks defined by the cuts 22 and 23 and the scores 24 are also folded downwardly at turret station No. 4 by the tools 199 on the arms of vertically reciprocating yoke 189. At station No. 5, the scissors arms 177, 179 are shifted toward each other into engagement with the side panels 12, 13 of the blanks 10 to overfold the side panels in the manner previously described. One cam cycle later, the carton blanks are discharged at ejector station No. 6, and are discharged from the trays 120 onto the sloping discharge plate 33 by projection of the ejector lever noses 158′ through the apertures 149 in the tray bottoms 140.

Figure 17:
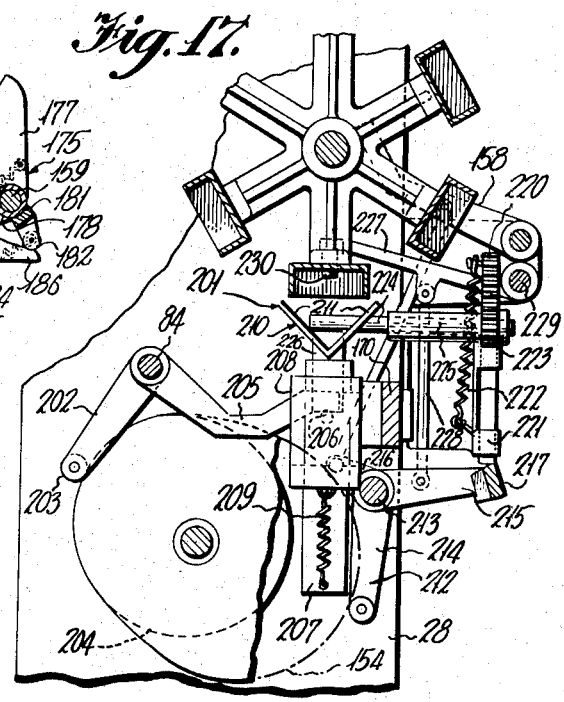
Figure 17 is an enlarged fragmentary vertical section view of the instrumentalities in a modified version of the present invention for overfolding the side walls of the carton, interlocking the locking flaps, forming the safety locks, and ejecting the set-up cartons.
Figure 18:
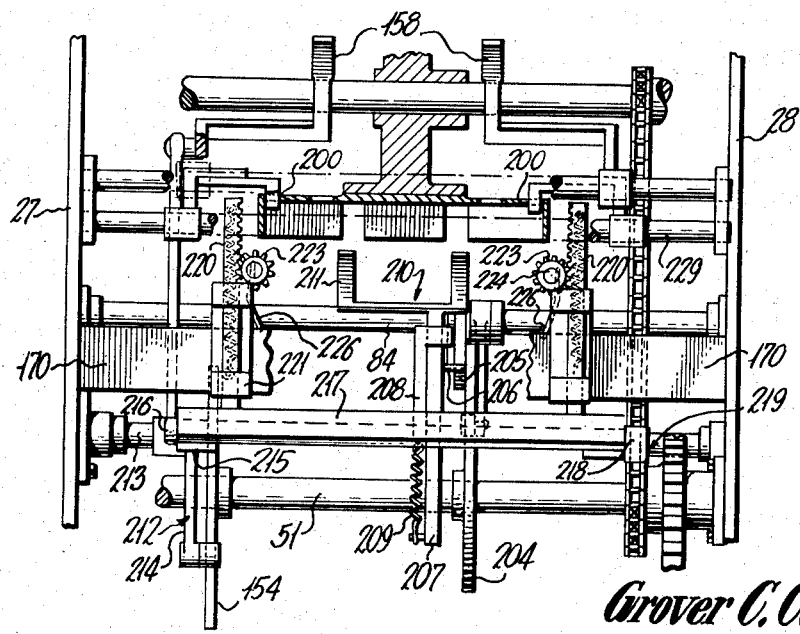
Figure 18 is an enlarged fragmentary front elevation view of the instrumentalities illustrated in Figure 17.

There is illustrated in Figures 17 and 18 a modified version of the mechanism for folding the side panels of the tray overcenter at turret station No. 4 and of the mechanism for tucking the tuck flaps 19, 20 into the cuts 22 at station No. 4, forming the safety locks adjacent the cuts 22 at station No. 4 and ejecting the set-up cartons from station No. 6. The modified mechanism for folding the side panels 12, 13 of the blanks overcenter which may displace the side folding assembly 175 of the first described embodiment, is indicated generally by reference character 201 and comprises a cam follower lever 202 journalled for rotation on the shaft 84 having a cam roller 203 on one end thereof riding on the periphery of cam 204 keyed to the master cam shaft 51. Projecting from the cam roller arm of the cam follower lever 202 in angular relation thereto is an arm 205 whose free end bears downwardly upon a laterally projecting pin 206 fixed to a slide bar 207 guided for vertical reciprocation in a guide block 208 mounted on the transverse cross brace 170 and disposed immediately beneath turret station No. 4. A conventional coil spring 209 is anchored at its lower end to the slide bar 207 and at its upper end to the guide block 208 to resiliently urge the slide bar 207 upwardly. Welded or otherwise affixed to the upper end of the slide bar 207 is a bifurcated shaper 210 having a laterally spaced pair of inclined arms 211 diverging at approximately 90 degrees and disposed so that their apices intercept the medial longitudinal bisecting plane of the tray 128 at turret station No. 4. The arms 211 are positioned so that they will register with the recesses 150 in the tray side walls 141 and force the side panels 12, 13 of the blank 10 toward each other about their score lines 12A—13A when the cam 204 shifts the cam follower lever 202 in a counterclockwise direction as viewed in Figure 17, permitting the slide bar 207 and bifurcated shaper 210 to be elevated under the influence of the coil spring 209. During a subsequent portion of the cycle of the cam 204, the cam follower lever 202 is rotated in a clockwise direction which, through the interaction of the end of arm 205 thereof and the pin 206 returns the slide bar 207 downwardly to the position illustrated in Figure 17.

The ejecting end flap tucking and safety lock forming mechanism comprises an actuating lever 212 keyed to a transverse shaft 213 journalled for rotation in suitable bearings affixed to the side plates 27 and 28 of the frame and having a depending leg 214 terminating in a cam roller riding on the periphery of cam 154, and a pair of oppositely projecting legs 215, 216. Fixed to the outer end of the leg 215 of the actuating lever 212 is a transversely extending actuating bar 217 secured at one end to the lever leg 215 and at the other end to the leg 218 of lever 219 which duplicates the legs 215, 216 of actuating lever 212 and is likewise keyed to the shaft 213. A pair of laterally spaced racks 220 supported for vertical reciprocation in guide blocks 221 likewise fixed on the cross brace 170 rest upon the actuating bar 217 and are resiliently urged downwardly against the bar 217 by coil springs 222 extending between the upwardly projecting portions of the racks 220 and the guide blocks 221. Gears 223 whose teeth are interfitted with the teeth of the racks 220 are fixed on shafts 224 which project through and are journalled for rotation in bearings 225 fixed to the cross brace 170. Welded to the inner ends of the shafts 224 are tuck flap folding tools 226. As is shown in Figure 18, the tuck flap folding tools 226 depend downwardly from the shafts 224 when the racks 220 are forced to their uppermost position by the actuating bar 217 of the lever 212 and are rotated through approximately 180 degrees toward each other by the downward movement of the racks 220 under the influence of their springs 222 when the lever 212 is rotated in a clockwise direction, as viewed in Figure 17, under the influence of the cam 154 to bring the tools 226 into engagement with the carton end flaps 16 at turret station No. 4 and shift the end flaps 16 and their underlying tuck flaps 19, 20 inwardly about their respective score lines to the extent necessary to project the pointed ends 21 of the tuck flaps into cuts 22.

One of a pair of safety lock forming levers 227 is connected to the actuating lever leg 215 near the midpoint thereof by a connecting rod 228. The levers 227 are keyed to a transverse shaft 229 journalled in suitable bearings mounted on extensions of the side plates 27, 28. The free ends of the levers 227 support downwardly projecting safety lock forming tools 230 of substantially triangular cross section, which simultaneously with elevation of the bifurcated shaper 210, enter the apertures 200 in the bottom of the tray 128 positioned at turret station No. 4 to form the safety locks defined by the cuts 22, slits 23 and scores 24 in the bottom of the blank 10. A connecting rod 231 is also connected between the free end of the lever leg 216 and one of a pair of ejecting levers 232 which are identical in construction and operation with the ejecting levers 158 described in the first embodiment of the invention.

While two preferred embodiments of the invention have been particularly shown and described, it is apparent that other modifications may be made in the invention without departing from the spirit and scope thereof, and it is desired, therefore, that only such limitations shall be placed thereon as are imposed by the prior art and are set forth in the appended claims.

I claim:

1. Apparatus for setting up flat monolayer carton blanks of the type having a bottom, sides and ends adapted to be folded upwardly therefrom, substantially rectangular gusset sections constituting continuations of said sides hinged to said sides and ends and adapted to be folded along substantially diagonal intermediate axes inwardly into underlying relation with the ends, and locking flaps hingedly connected to said gusset sections forming axial extensions of said sides and gusset sections foldable over the infolded gusset sections and engageable with cuts at the junctions of the ends with the bottom, comprising a hopper for the flat blanks, a fixed forming die, means for presenting the flat carton blanks one at a time from the hopper to a position overlying said forming die, said forming die having a rectangular opening therethrough corresponding in area to said bottom, reciprocating plunger means mounted for rectilinear oscillation from a position above said forming die for forcing the blanks in horizontal position through said forming die, said forming die having means engageable with the blank for successively folding said sides and then said ends upwardly into vertical position during travel of the blank as the bottom in horizontal position is forced through said forming die opening and means for infolding said hinge sections about their diagonal axes during said travel to position the segments thereof in parallel underlying relation to said ends, means for advancing said blanks from said forming die to a locking station, means at said locking station for folding said locking flaps about their hinges into underlying relation with the infolded gusset sections and engaging the locking flaps within the cuts at the junctions of the ends with the bottom for restraining said locking flaps in a position wherein the infolded gusset sections are sandwiched between said locking flaps and said ends, and means for discharging said blanks from the apparatus.

2. Apparatus for setting up flat monolayer carton blanks of the type having a bottom, sides and ends adapted to be folded upwardly therefrom, substantially rectangular gusset sections constituting continuations of said sides hinged to said sides and ends and adapted to be folded along substantially diagonal intermediate axes inwardly into underlying relation with the ends, and locking flaps hingedly connected to said gusset sections forming axial extensions of said sides and gusset sections foldable over the infolded gusset sections and engageable with cuts at the junctions of the ends with the bottom, comprising a hopper for the flat blanks, a fixed forming die, means for presenting the flat carton blanks one at a time from the hopper to a position overlying said forming die, said forming die having a rectangular opening therethrough corresponding in area to said bottom, reciprocating plunger means mounted for rectilinear oscillation from a position above said forming die for forcing the blanks in horizontal position through said forming die, said forming die including side plow plates bounding said rectangular opening for folding the sides, gusset sections and locking flaps of the blank upwardly into vertical position about parallel axes at the lateral margins of the bottom during movement of the blank through an upper zone of said forming die opening, fixed cross partition plow plates extending between said side plow plates for folding said ends upwardly into vertical position during movement of said blank through a lower zone of said forming die opening, means in said forming die projecting into intercepting relation with the blank moving between said side plow plates actuated by said blank for folding said gusset sections inwardly about their diagonal axes immediately in advance of and during movement of said blank through said lower zone to position said gusset sections and said locking flaps in underlying parallel relation with said ends when said ends are folded to erect position, means for advancing said blanks from said forming die to a locking station, means at said locking station for folding said locking flaps about their hinges into underlying relation with the infolded gusset sections and engaging the locking flaps within the cuts at the junctions of the ends with the bottom for restraining said locking flaps in a position wherein the infolded gusset sections are sandwiched between said locking flaps and said ends, and means for discharging said blanks from the apparatus.

3. Apparatus for setting up flat monolayer carton blanks of the type having a bottom, sides and ends adapted to be folded upwardly therefrom, substantially rectangular gusset sections constituting continuations of said sides hinged to said sides and ends and adapted to be folded along substantially diagonal intermediate axes inwardly into underlying relation with the ends, and locking flaps hingedly connected to said gusset sections forming axial extensions of said sides and gusset sections foldable over the infolded gusset sections and engageable with cuts at the junctions of the ends with the bottom, comprising a hopper for the flat blanks, a fixed forming die, means for presenting the flat carton blanks one at a time from the hopper to a position overlying said forming die, said forming die having a rectangular opening therethrough corresponding in area to said bottom, reciprocating plunger means mounted for rectilinear oscillation from a position above said forming die for forcing the blanks in horizontal position through said forming die, said forming die including side plow plates bounding said rectangular opening for folding the sides, gusset sections and locking flaps of the blank upwardly into vertical position about parallel axes at the lateral margins of the bottom during movement of the blank through an upper zone of said forming die opening, a pair of spaced parallel end plow plates bounding said rectangular opening extending between said side plow plates intermediate the ends thereof with their upper edges located below the upper reaches of said side plow plates for folding said side ends upwardly into vertical position during movement of said blanks through a lower zone of said rectangular opening, lever means pivoted on said side plow plates adjacent each corner of said rectangular opening for movement in vertical planes immediately outwardly of said rectangular opening and paralleling said end plow plates, said lever means each having an arm extending vertically along the inner surface of one of said side plow plates and outside of said rectangular opening and a shoulder projecting into the area between said side plow plates and immediately above said lower zone to be actuated by the blanks and pivot said lever means toward the medial axis of said opening into engagement with said gusset sections at their diagonal axes and fold said gusset sections and said locking flaps into underlying relation with said ends, means for advancing said blanks from said forming die to a locking station, means at said locking station for folding said locking flaps about their hinges into underlying relation with the infolded gusset sections to project the ends of the locking flaps into the cuts at the junctions of the ends with the bottom, and means for discharging said blanks from the apparatus.

4. Apparatus for setting up flat monolayer carton blanks of the type having a bottom, sides and ends adapted to be folded upwardly therefrom, gusset sections adapted to be folded along substantially diagonal intermediate axes inwardly into underlying relation with the ends, and locking flaps foldable over the infolded gusset sections and engageable within cuts at the junctions of the ends with the bottom, comprising a hopper for the flat blanks, a fixed forming die, means for presenting the flat carton blanks one at a time along a horizontal path to said forming die, said forming die having a rectangular opening therethrough corresponding in area to said bottom and marginal surfaces at the opening engageable with the blank during travel of the blank vertically downwardly through said opening for folding the sides and ends upwardly, reciprocating plunger means for forcing the blanks in horizontal position through said forming die, means in said forming die for folding said gusset sections inwardly to position said gusset sections and said locking flaps in underlying parallel relation with said ends when said ends are folded upwardly, rotatable receiving means supported for rotation about a horizontal axis lying in the vertical medial longitudinal plane of said rectangular opening for receiving said blanks from said forming die and successively advancing the same step-wise along a cylindrical path through a plurality of manipulating stations at spaced locations along said cylindrical path, tucking means at one of said manipulating stations for folding said locking flaps into coplanar relation with said ends and inserting said locking flaps into the cuts at the junctions of the ends with the bottom, ejecting means at another of said manipulating stations for discharging the blanks from said rotatable receiving means, and means for cyclically actuating said plunger and said tucking and ejecting means and rotating said receiving means in preselected time relation.

5. Apparatus for setting up flat monolayer carton blanks of the type having a bottom, sides and ends adapted to be folded upwardly therefrom, gusset sections adapted to be folded along substantially diagonal intermediate axes inwardly into underlying relation with the ends, and locking flaps foldable over the infolded gusset sections and engageable within cuts at the junctions of the ends with the bottom, comprising a hopper for the flat blanks, a fixed forming die, means for presenting the flat carton blanks one at a time along a horizontal path to said forming die, said forming die having a rectangular opening therethrough corresponding in area to said bottom and marginal surfaces at the opening engageable with the blank during travel of the blank vertically downwardly through said opening for folding the sides and ends upwardly, reciprocating plunger means for forcing the blanks in horizontal position through said forming die, means in said forming die for folding said gusset sections inwardly to position said gusset sections and said locking flaps in underlying parallel relation with said ends when said ends are folded upwardly, turret means supported for rotation about a horizontal axis lying in the medial longitudinal plane of said rectangular opening having a plurality of radial arms and radially opening tray members supported thereon each for receiving and removably supporting a carton blank, Geneva drive means for rotating said turret means in step-wise fashion about said horizontal axis for positioning said tray members to receive said blanks from said forming die and successively advance the same along a cylindrical path through a plurality of spaced manipulating stations, overfolding means located at one of said manipulating stations shiftable into engagement with the sides of said blanks supported in said tray members to position said sides at acute angles with the bottoms associated therewith, tucking means at one of said manipulating stations pivotable in opposite directions about the ends of the blanks supported by said trays for folding the locking flaps of said blanks inwardly of said ends and into the cuts at the junctions of the ends with the bottom wherein the infolded gusset sections are sandwiched between said locking flaps and said ends, ejecting means located at another of said manipulating stations having portions projectable into said trays for forcing the blanks from supported relation with said trays, and cam means for actuating said manipulating means simultaneously.

6. Apparatus for setting up flat monolayer carton blanks of the type having a bottom, sides and ends adapted to be folded upwardly therefrom, gusset sections adapted to be folded along substantially diagonal intermediate axes inwardly into underlying relation with the ends, and locking flaps foldable over the infolded gusset sections and engageable within cuts at the junctions of the ends with the bottom, comprising a hopper for the flat blanks, a fixed forming die, means for presenting the flat carton blanks one at a time along a horizontal path to said forming die, said forming die having a rectangular opening therethrough corresponding in area to said bottom and marginal surfaces at the opening engageable with the blank during travel of the blank vertically downwardly through said opening for folding the sides and ends upwardly, reciprocating plunger means for forcing the blanks in horizontal position through said forming die, means in said forming die for folding said gusset sections inwardly to position said gusset sections and said locking flaps in underlying parallel relation with said ends when said ends are folded upwardly, turret means supported for rotation about a horizontal axis lying in the medial longitudinal plane of said rectangular opening having a plurality of radial arms and radially opening tray members supported thereon each for receiving and removably supporting a carton blank, Geneva drive means for rotating said turret means in step-wise fashion about said horizontal axis for positioning said tray members to receive said blanks from said forming die and successively advance the same along a cylindrical path through a plurality of spaced manipulating stations, tucking means at one of said manipulating stations pivotable in opposite directions about the ends of the blanks supported by said trays for folding the locking flaps of said blanks inwardly of said ends and into the cuts at the junctions of the ends with the bottom wherein the infolded gusset sections are sandwiched between said locking flaps and said ends, ejecting means located at another of said manipulating stations having portions projectable into said trays for forcing the blanks from supported relation with said trays, and cam means for actuating said manipulating means simultaneously.

7. Apparatus for setting up flat monolayer carton blanks of the type having a bottom, sides and ends adapted to be folded upwardly therefrom, substantially rectangular gusset sections constituting continuations of said sides hinged to said sides and ends and adapted to be folded along substantially diagonal intermediate axes inwardly into underlying relation with the ends, and locking flaps hingedly connected to said gusset sections forming axial extensions of said sides and gusset sections foldable over the infolded gusset sections and engageable with cuts at the junctions of the ends with the bottom, comprising a hopper for the flat blanks, a fixed forming die, means for presenting the flat carton blanks one at a time from the hopper to a position overlying said forming die, said forming die having a rectangular opening therethrough corresponding in area to said bottom, reciprocating plunger means mounted for rectilinear oscillation from a position above said forming die for forcing the blanks in horizontal position through said forming die, said forming die including side plow plates bounding said rectangular opening for folding the sides, gusset sections and locking flaps of the blank upwardly into vertical position about parallel axes at the lateral margins of the bottom during movement of the blank through an upper zone of said forming die opening, fixed cross partition plow plates extending between said side plow plates for folding said ends upwardly into vertical position during movement of said blank through a lower zone of said forming die opening, means in said forming die projecting into intercepting relation with the blank moving between said side plow plates actuated by said blank for folding said gusset sections inwardly about their diagonal axes immediately in advance of and during movement of said blank through said lower zone to position said gusset sections and said locking flaps in underlying parallel relation with said ends when said ends are folded to erect position, rotatable receiving means supported for rotation about a horizontal axis lying in the vertical medial longitudinal plane of said rectangular opening for receiving said blanks from said forming die and successively advancing the same step-wise along a cylindrical path through a plurality of manipulating stations at spaced locations along said cylindrical path, tucking means at one of said manipulating stations for folding said locking flaps into coplanar relation with said ends and inserting said locking flaps into the cuts at the junctions of the ends with the bottom, ejecting means at another of said manipulating stations for discharging the blanks from said rotatable receiving means, and means for cyclically actuating said plunger and said tucking and ejecting means and rotating said receiving means in preselected time relation.

8. Apparatus for setting up flat monolayer carton blanks of the type having a bottom, sides and ends adapted to be folded upwardly therefrom, substantially rectangular gusset sections constituting continuations of said sides hinged to said sides and ends and adapted to be folded along substantially diagonal intermediate axes inwardly into underlying relation with the ends, and locking flaps hingedly connected to said gusset sections forming axial extensions of said sides and gusset sections foldable over the infolded gusset sections and engageable with cuts at the junctions of the ends with the bottom, comprising a hopper for the flat blanks, a fixed forming die, means for presenting the flat carton blanks one at a time from the hopper to a position overlying said forming die, said forming die having a rectangular opening therethrough corresponding in area to said bottom, reciprocating plunger means mounted for rectilinear oscillation from a position above said forming die for forcing the blanks in horizontal position through said forming die, said forming die including side plow plates bounding said rectangular opening for folding the sides, gusset sections and locking flaps of the blank upwardly into vertical position about parallel axes at the lateral margins of the bottom during movement of the blank through an upper zone of said forming die opening, fixed cross partition plow plates extending between said side plow plates for folding said ends upwardly into vertical position during movement of said blank through a lower zone of said forming die opening, means in said forming die projecting into intercepting relation with the blank moving between said side plow plates actuated by said blank for folding said gusset sections inwardly about their diagonal axes immediately in advance of and during movement of said blank through said lower zone to position said gusset sections and said locking flaps in underlying parallel relation with said ends when said ends are folded to erect position, turret means supported for rotation about a horizontal axis lying in the medial longitudinal plane of said rectangular opening having a plurality of radial arms and radially opening tray members supported thereon each for receiving and removably supporting a carton blank, Geneva drive means for rotating said turret means in step-wise fashion about said horizontal axis for positioning said tray members to receive said blanks from said forming die and successively advance the same along a cylindrical path through a plurality of spaced manipulating stations, overfolding means located at one of said manipulating stations shiftable into engagement with the sides of said blanks supported in said tray members to position said sides at acute angles with the bottoms associated therewith, tucking means at one of said manipulating stations pivotable in opposite directions about the ends of the blanks supported by said trays for folding the locking flaps of said blanks inwardly of said ends and into the cuts at the junctions of the ends with the bottom wherein the infolded gusset sections are sandwiched between said locking flaps and said ends, ejecting means located at another of said manipulating stations having portions projectable into said trays for forcing the blanks from supported relation with said trays, and cam means for actuating said manipulating means simultaneously.

9. Apparatus for setting up flat monolayer carton blanks of the type having a bottom, sides and ends adapted to be folded upwardly therefrom, substantially rectangular gusset sections constituting continuations of said sides hinged to said sides and ends and adapted to be folded along substantially diagonal intermediate axes inwardly into underlying relation with the ends, and locking flaps hingedly connected to said gusset sections forming axial extensions of said sides and gusset sections foldable over the infolded gusset sections and engageable with cuts at the junctions of the ends with the bottom, comprising a hopper for the flat blanks, a fixed forming die, means for presenting the flat carton blanks one at a time from the hopper to a position overlying said forming die, said forming die having a rectangular opening therethrough corresponding in area to said bottom, reciprocating plunger means mounted for rectilinear oscillation from a position above said forming die for forcing the blanks in horizontal position through said forming die, said forming die including side plow plates bounding said rectangular opening for folding the sides, gusset sections and locking flaps of the blank upwardly into vertical position about parallel axes at the lateral margins of the bottom during movement of the blank through an upper zone of said forming die opening, a pair of spaced parallel end plow plates bounding said rectangular opening extending between said side plow plates intermediate the ends thereof with their upper edges located below the upper reaches of said side plow plates for folding said ends upwardly into vertical position during movement of said blanks through a lower zone of said rectangular opening, lever means pivoted on said side plow plates adjacent each corner of said rectangular opening for movement in vertical planes immediately outwardly of said rectangular opening and paralleling said end plow plates, said lever means each having an arm extending vertically along the inner surface of one of said side plow plates and outside of said rectangular opening and a shoulder projecting into the area between said side plow plates and immediately above said lower zone to be actuated by the blanks and pivot said lever means toward the medial axis of said opening into engagement with said gusset sections at their diagonal axes and fold said gusset sections and said locking flaps into underlying relation with said ends, turret means supported for rotation about a horizontal axis lying in the medial longitudinal plane of said rectangular opening having a plurality of radial arms and radially opening tray members supported thereon each for receiving and removably supporting a carton blank, Geneva drive means for rotating said turret means in step-wise fashion about said horizontal axis for positioning said tray members to receive said blanks from said forming die and successively advance the same along a cylindrical path through a plurality of spaced manipulating stations, overfolding means located at one of said manipulating stations shiftable into engagement with the sides of said blanks supported in said tray members to position said sides at acute angles with the bottoms associated therewith, tucking means at another of said manipulating stations pivotable in opposite directions about the ends of the blanks supported by said trays for folding the locking flaps of said blanks inwardly of said ends and into the cuts at the junctions of the ends with the bottom wherein the infolded gusset sections are sandwiched between said locking flaps and said ends, ejecting means located at another of said manipulating stations having portions projectable into said trays for forcing the blanks from supported relation with said trays, and cam means for actuating said manipulating means simultaneously.

10. The combination recited in claim 5 wherein said tray members comprise a bottom and integral side and end walls, said side walls each having a pair of uniformly spaced recesses extending downwardly from the free edges thereof for exposing portions of the free edges of the sides of carton blanks received therein, said overfolding means comprising a pivoted lever having a cam follower arm actuated by said cam means to oscillate a working end thereof, a rectilinearly reciprocable overfolding tool supported for movement toward and away from the tray members located at one of said manipulating stations having diverging arms engageable through the recesses in said tray member side walls with said sides of the blanks to force said sides toward each other to assume acute angles with the bottoms of said blanks, and connecting rod means interconnecting said overfolding tool with said working end of said lever for actuating said tool in accordance with oscillation of said lever.

11. The combination recited in claim 5 wherein said tray members comprise a bottom and integral side and end walls, said side walls each having a pair of uniformly spaced recesses extending downwardly from the free edges thereof for exposing portions of the free edges of the side panels of carton blanks received therein, said overfolding means comprising a scissors mechanism including laterally spaced pairs of scissors arms pivotable about a common axis to converge into engagement through the recesses in said tray member side walls with said side panels of the blanks to force said side panels toward each other to assume acute angles with the bottoms of said blanks and to diverge out of engagement therewith, a cam actuated rectilinearly reciprocable member having scissors actuating cam surfaces thereon, and cam follower means projecting from said scissors mechanism for actuating the arms of the scissors mechanism in response to movement of said rectilinearly reciprocable member.

12. Apparatus for setting up flat carton blanks of the type having a bottom panel and side and end panels hinged thereto adapted to be folded upwardly into perpendicular relation to the bottom panel and sections hinged to said side panels and forming longitudinal extensions thereof adapted to be folded inwardly into underlying relation to said end panels, comprising a forming station, means for presenting the flat blanks one at a time to said forming station, means at said forming station for folding said side panels and end panels into substantially perpendicular relation to said bottom panel about the hinged connections therewith, turret means supported for rotation about a horizontal axis located below said forming station, said turret means having a plurality of radial arms radiating from said axis and blank supporting members carried by said radial arms at the outer ends thereof in a cylindrical path concentric with said axis, a plurality of circumferentially spaced stations for said blank supporting members uniformly disposed along said cylindrical path, one of said stations being a blank receiving station proximate to said forming station wherein said blank supporting members are positioned to receive blanks one at a time at said forming station, means for rotating said turret means in step-wise fashion about said horizontal axis to intermittently advance said supporting members along said cylindrical path through said spaced stations, and ejecting means located at one of said spaced stations spaced several stations from the blank receiving station for discharging the blanks from said blank supporting members.

13. Apparatus for setting up flat monolayer carton blanks of the type having a bottom panel and side and end panels hinged thereto adapted to be folded upwardly into perpendicular relation to the bottom panel and sections hinged to said side panels and forming longitudinal extensions thereof adapted to be folded inwardly into underlying relation to said end panels, comprising a forming station, means for presenting the flat blanks one at a time to said forming station, means at said forming station for folding said side panels and end panels into substantially perpendicular relation to said bottom panel about the hinged connections therewith, turret means supported for rotation about a horizontal axis located below said forming station, said turret means having a plurality of radial arms radiating from said axis and blank supporting members carried by said radial arms at the outer ends thereof in a cylindrical path concentric with said axis, said blank supporting members having a plurality of circumferentially spaced stations uniformly disposed along said cylindrical path, one of said stations being a blank receiving station proximate to said forming station to receive blanks one at a time at said forming station, clamping means carried by said blank supporting members for engaging the end panels of blanks carried by said blank supporting members and releasably gripping said blanks, means for rotating said turret means in stepwise fashion about said horizontal axis to intermittently advance said supporting members along said cylindrical path through said spaced stations, means holding said clamping means in gripping relation with said blanks on said blank supporting members over a portion of the cylindrical path encompassing the plurality of said spaced stations along said path, ejecting means located at one of said spaced stations spaced several stations from the blank receiving station for discharging the blanks from said blank supporting members, and means for actuating said clamping means when said blank supporting members occupy the spaced station associated with said ejecting means for releasing said clamping means from said gripping relation with said blanks.

14. Apparatus for setting up flat monolayer carton blanks of the type having a bottom panel and side and end panels hinged thereto adapted to be folded upwardly into perpendicular relation to the bottom panel and sections hinged to said side panels and forming longitudinal extensions thereof adapted to be folded inwardly into underlying relation to said end panels, comprising a forming station, means for presenting the flat blanks one at a time to said forming station, means at said forming station for folding said side panels and end panels into substantially perpendicular relation to said bottom panel about the hinged connections therewith, turret means supported for rotation about a horizontal axis located below said forming station, said turret means having a plurality of radial arms extending along uniformly spaced radii of said horizontal axis and arranged in laterally aligned pairs of radial arms lying in laterally spaced vertical planes and carrier members for said blanks supported on the ends of said arms remote from said axis in a cylindrical path concentric with said axis for receiving and supporting said carton blanks, means for rotating said turret means in step-wise fashion about said horizontal axis to position said carrier members to each receive one of said blanks at said forming station and intermittently advance the same sequentially along said cylindrical path to each of a series of spaced stations uniformly angularly spaced radially about said horizontal axis, the last of said spaced stations in the direction of travel of said carrier members away from the station wherein said carrier members receive said blanks at said forming station being an ejecting station, and ejecting means associated with said ejecting station for releasably engaging said blanks at said ejecting station and withdrawing the same from said carrier members.

15. The combination recited in claim 14, wherein said carrier members include clamping means for engaging the panels of the blanks carried by said carrier members and releasably holding said blanks in supported relation by said carrier members, and means are associated with said ejector station for releasing said clamping means from holding relation with said blanks.

16. Apparatus for setting up flat monolayer carton blanks of the type having a bottom, sides and ends adapted to be folded upwardly therefrom, gusset sections adapted to be folded along substantially diagonal intermediate axes inwardly into underlying relation with the ends, and locking flaps foldable over the infolded gusset sections and engageable within cuts at the junctions of the ends with the bottom, comprising a forming station, means for presenting the flat blanks one at a time to said forming station, a forming die at said forming station for folding said sides and ends into substantially perpendicular relation to the bottom, reciprocating plunger means for forcing the blanks in horizontal position downwardly through said forming die, rotatable receiving means supported for rotation about a horizontal axis lying in the vertical medial longitudinal plane of said rectangular opening for receiving said blanks from said forming die and successively advancing the same step-wise along a cylindrical path through a plurality of manipulating stations at spaced locations along said cylindrical path, tucking means at one of said manipulating stations for folding said locking flaps into coplanar relation with said ends and inserting said locking flaps into the cuts at the junctions of the ends with the bottom, ejecting means at another of said manipulating stations for discharging the blanks from said rotatable receiving means, and means for cyclically actuating said plunger and said tucking and ejecting means and rotating said receiving means in preselected time relation.

References Cited in the file of this patent

UNITED STATES PATENTS

| | | |
|---|---|---|
| 2,110,368 | Lautzenheiser | Mar. 8, 1938 |
| 2,614,466 | Palmer | Oct. 21, 1952 |
| 2,727,444 | Wethe | Dec. 20, 1955 |